Figure 1:
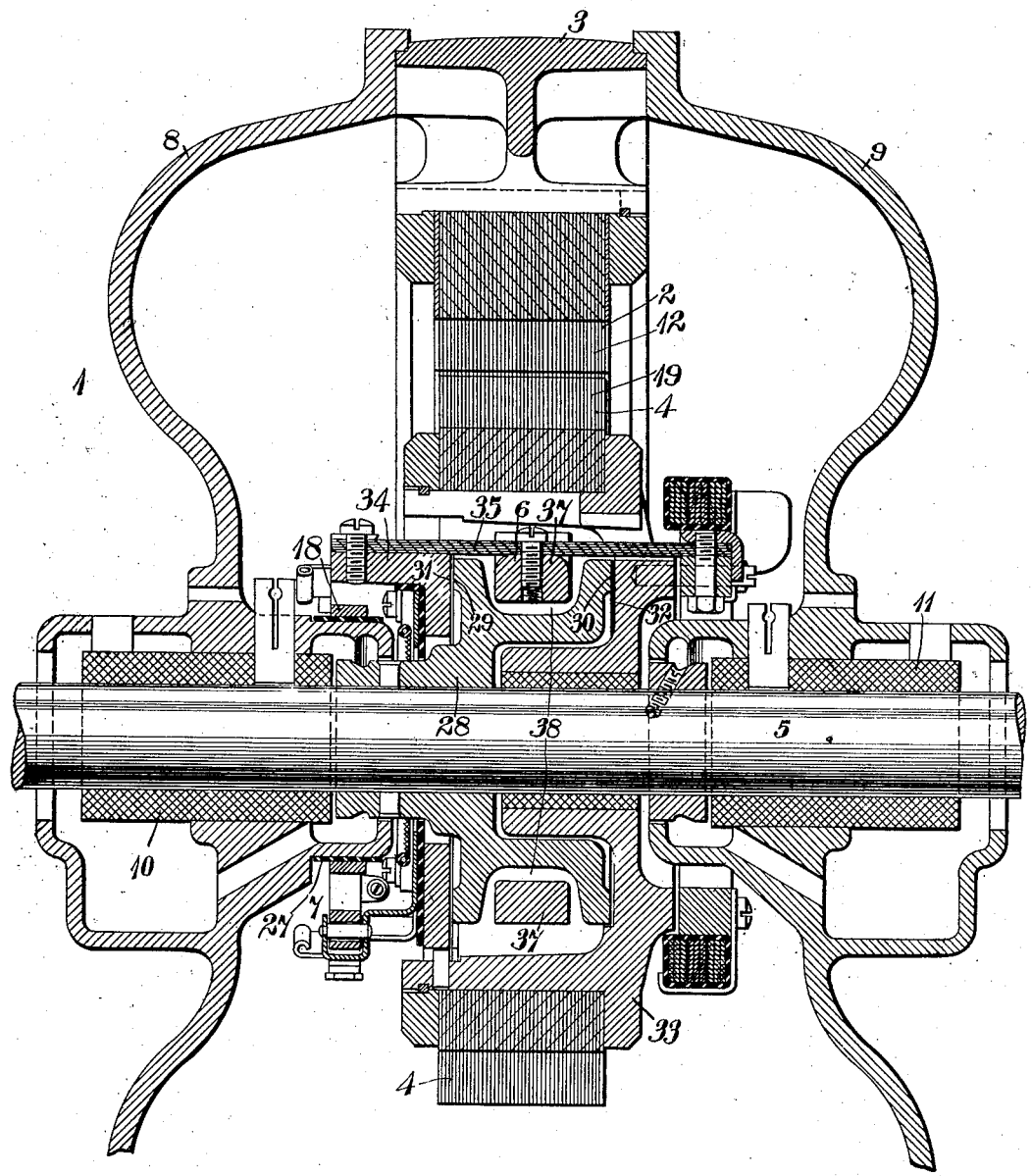

B. G. LAMME, R. S. FEICHT & G. H. GARCELON.
DYNAMO ELECTRIC MACHINE.
APPLICATION FILED SEPT. 13, 1905.

940,698.

Patented Nov. 23, 1909.

2 SHEETS—SHEET 1.

WITNESSES:
Fred. H. Miller
R. J. Dearborn.

INVENTORS
Benj. G. Lamme
Russell S. Feicht
& George H. Garcelon
BY
Wesley G. Carr
ATTORNEY.

B. G. LAMME, R. S. FEICHT & G. H. GARCELON.
DYNAMO ELECTRIC MACHINE.
APPLICATION FILED SEPT. 13, 1905.

940,698.

Patented Nov. 23, 1909.

2 SHEETS—SHEET 2.

WITNESSES:
Fred. H. Miller
R. J. Dearborn

INVENTORS
Benj. G. Lamme
Russell S. Feicht
George H. Garcelon
BY
Wesley G. Carr
ATTORNEY

UNITED STATES PATENT OFFICE.

BENJAMIN G. LAMME AND RUSSELL S. FEICHT, OF PITTSBURG, AND GEORGE H. GARCELON, OF WILKINSBURG, PENNSYLVANIA, ASSIGNORS TO WESTINGHOUSE ELECTRIC & MANUFACTURING COMPANY, A CORPORATION OF PENNSYLVANIA.

DYNAMO-ELECTRIC MACHINE.

946,698.

Specification of Letters Patent. Patented Nov. 23, 1909.

Application filed September 13, 1905. Serial No. 278,334.

*To all whom it may concern:*

Be it known that we, BENJAMIN G. LAMME and RUSSELL S. FEICHT, residents of Pittsburg, and GEORGE H. GARCELON, a resident of Wilkinsburg, in the county of Allegheny and State of Pennsylvania, citizens of the United States, have invented a new and useful Improvement in Dynamo - Electric Machines, of which the following is a specification.

Our invention relates to dynamo-electric machines and has particular reference to means for automatically starting electric motors with a minimum expenditure of energy.

The object of our invention is to provide means for automatically governing the circuit connections of the primary and secondary windings of a motor, to obtain effective starting and efficient running conditions and for gradually applying a mechanical load, that shall be simple and durable in construction and the operation of which shall be dependent upon the speed of its rotating member.

In single phase alternating current electric motors of the induction type and in other motors having similar characteristics, it is desirable to reduce the starting currents to minimum values since they are usually excessive and particularly when the motor is started under load. In order to improve the conditions existing during the period of starting the motor, it has been usual to provide a hand-operated starting switch or controller by means of which a change in the circuit connections of the primary winding of the motor could be effected, and to employ clutch pulleys to grip the load when a predetermined speed was attained.

According to our invention we provide starting and running windings for the stationary primary member of a motor and any suitable means for effecting phase displacement of the currents in the two windings, such as by the proper arrangement of resistances, reactances or condensers. The rotatable core portion may be provided with a three-phase Y-connected secondary winding having suitable resistances in series with each phase or some other desirable winding with which resistances may be advantageously employed for starting the motor. The secondary core member is rotatably mounted on its shaft and as it approaches a predetermined speed, a clutch mechanism is gradually actuated to drive the shaft, the primary starting winding circuit is automatically broken and a low-resistance circuit for the secondary winding is established so that specially favorable conditions are obtained during the starting period, and the connections are automatically varied to give efficient continuous operation.

Our invention is illustrated in the accompanying drawings in which—

Figure 2:
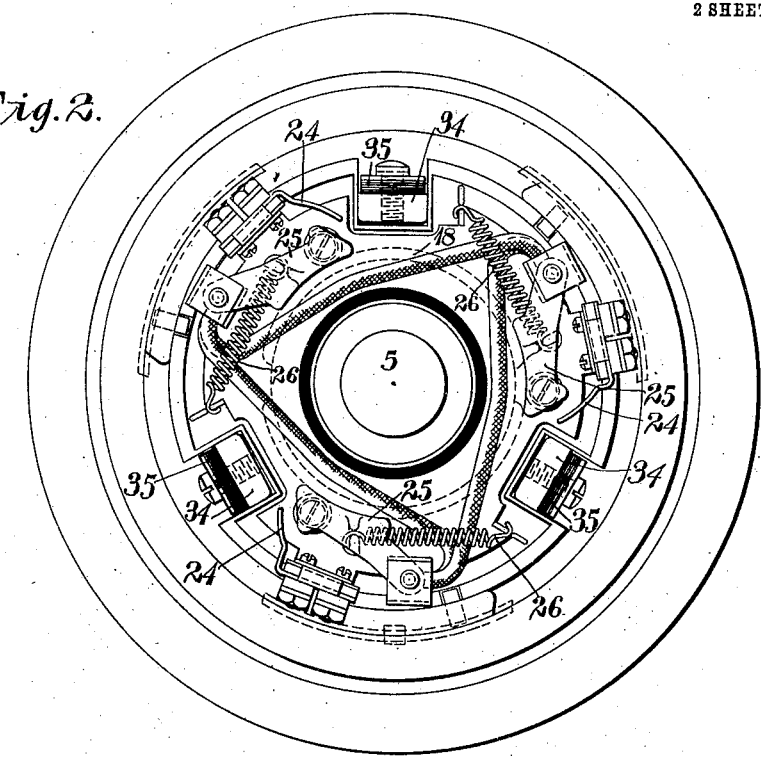
Figure 3:
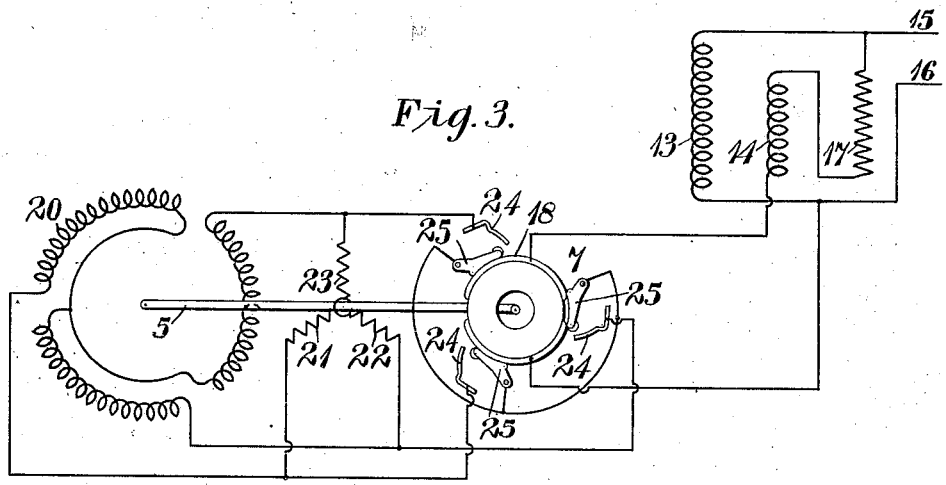

Figure 1 is a partial section through the center line of the shaft and Fig. 2 a partial, end elevation of a machine constructed in accordance therewith, the winding of both the primary and the secondary members being omitted to more fully disclose the automatic regulating mechanism and Fig. 3 is a diagrammatic view of suitable windings and circuit connections for the motor of Figs. 1 and 2.

Referring to the drawings, the motor 1 comprises a stationary magnetizable core 2 and a supporting frame 3 therefor, a rotatably mounted, substantially cylindrical core member 4, a rotatable driving shaft 5, a mechanical clutch device 6, a centrifugal switch 7 and a plurality of end bells 8 and 9, that are respectively provided with similar stationary bearings 10 and 11.

The stationary core 2 is provided, near its inner cylindrical surface, in the usual manner, with a plurality of slots 12, in which a primary magnetizing winding 13 and a starting winding 14 are located. The winding 13 is connected across a supply circuit 15 and 16 and the winding 14 is either composed of relatively high resistance conductors or has a suitable ohmic resistance 17 connected in series with it. Any other suitable means may be employed for causing phase displacement of the currents in the respective primary windings, such as reactance in circuit with either of the windings, or resistance in the circuit of winding and reactance in the circuit of the other, or by the proper arrangement of condensers. The rotatable core portion 4 is provided with a plurality of slots 19 in which a three-phase Y-connected secondary winding 20 is located, said winding being connected to a resistance which comprises three parts 21, 22 and 23. The three terminals of the winding 20 are respectively connected to one end of each of the resistance portions 21, 22 and 23 and to three contact members 24 of the switch 7 that are attached to the rotatable core member, the opposite ends of the resistances 21, 22 and 23 being connected together.

The switch 7 comprises two ring segments 18 that are mounted upon an extension of the end bell 8 and are insulated therefrom by an insulating ring 27; three inter-connected movable contact members 25 that are pivotally mounted upon the rotatable core member and may be uniformly disposed thereon and normally held in engagement with the stationary ring segments 18 by springs 26 to complete a circuit through the starting winding until the rotatable core member reaches a predetermined speed at which the centrifugal force due to the rotation of the contact members exceeds the retaining force of the springs 26, and causes the contact members 25 to be disengaged from the ring segments 18 and moved into engagement with the contact members 24, thereby opening the starting circuit and establishing a low-resistance circuit for the secondary winding.

The clutch device 6 comprises a collar 28 which is fixed to the shaft 5 and is provided with a plurality of annular friction surfaces 29 and 30, that are engaged by corresponding surfaces 31 and 32 on a spider 33 which is rotatably mounted on the shaft 5 and supports the core portion 4, and a friction ring 34 is so supported by said spider that a limited longitudinal movement is permitted. The spider 33 and ring 34 are connected by a plurality of laminated steel springs 35 which are attached thereto and project through slots or openings in the spider. When the rotatable member of the core is at rest, the springs 35 slightly separate the two adjacent annular surfaces 31 and 32 from the corresponding annular surfaces on the collar 28 so that the rotatable core portion 4 together with the ring 34 may be rotated by the action of the rotating magnetic field induced in the secondary winding 20 without driving the shaft 5 until a predetermined speed is reached. This predetermined speed is determined by a plurality of weights 37 which are fastened near the middle points of the steel springs 35 and are located in an annular groove 38 in the collar 28, being actuated centrifugally to bring the friction surfaces 31 and 32 into respective engagement with the friction surfaces 29 and 30. In this way the shaft may be belted or direct connected to a load corresponding to the maximum load for which the motor is designed and will be driven by means of the engagement of the aforesaid friction surfaces, which will gradually bring the speed of the shaft to correspond to that of the rotatable core 4, and will further tend to minimize the current supplied to the motor at starting.

Although we have shown and described a specific combination we desire that all variations in the form of windings and arrangement of details which do not materially depart from the spirit of our invention, shall be included within its scope.

We claim as our invention:

1. In a dynamo-electric machine, the combination with a primary core member, windings therefor having different time constants, a relatively rotatable secondary core member, a winding therefor and a resistance in circuit therewith, of an automatically operated means serving to cut one of the primary windings out of circuit and also to remove the resistance from the secondary circuit.

2. In a dynamo-electric machine, the combination with a primary core member, windings therefor having different time constants, a relatively rotatable secondary core member, a winding therefor and a resistance in circuit therewith, of automatically operated means serving to cut one of the primary windings out of circuit and also to remove the resistance from the secondary circuit, the operation of said means being dependent upon the speed of rotation of the machine.

3. In a dynamo-electric machine, the combination with a primary core member, windings therefor having different time constants, a relatively rotatable secondary core member, a polyphase winding therefor and a resistance in each leg of said winding, of automatically operated means serving to cut one of the primary windings out of circuit and also to remove the resistance from the secondary circuit, the operation of said means being dependent upon the speed of rotation of the machine.

4. In a dynamo-electric machine, the combination with relatively rotatable primary and secondary core members, windings for the primary core member having different time constants, a winding for the secondary core member, a resistance in circuit therewith, and a shaft, of means operated by centrifugal force to cut one of the primary windings out of circuit and to remove the resistance from the secondary circuit, and means operated by centrifugal force to connect one of the members to the shaft when a certain speed of rotation is attained.

5. In a dynamo-electric machine, the combination with relatively rotatable primary and secondary core members, windings for the primary core member having different time constants, a winding for the secondary core member, a resistance in circuit therewith, and a shaft, of automatically operated means serving to cut one of the primary windings out of circuit and to remove the resistance from the secondary circuit, and an automatically operated means for connecting one of the members to the shaft, said means being operated in a predetermined sequence.

6. In a dynamo-electric machine, the combination with relatively rotatable primary and secondary core members, a starting and a running winding for the primary core member, a resistance in the circuit of the starting winding, a polyphase winding for the secondary core member, a resistance in each leg of said winding, and a shaft, of means operated by centrifugal force to cut the starting winding and its resistance out of circuit and also to remove the resistance from the secondary circuit.

7. In a dynamo-electric machine, the combination with relatively rotatable primary and secondary core members, windings for the primary core member having different time constants, a winding for the secondary core member, a resistance in circuit therewith, and a shaft, of automatically operated means for cutting one of the primary windings out of circuit, and for removing the resistance from the secondary circuit and automatically operated means for connecting one of the members to the shaft, said means being operated in a predetermined sequence and being dependent in operation upon the speed of rotation of the machine.

8. In a dynamo-electric machine, the combination with relatively rotatable primary and secondary core members, windings for the primary core member having different time constants, a winding for the secondary core member and a resistance in circuit with said secondary winding, of insulated conducting segments constituting circuit terminals for one of the primary windings, terminal pieces connected to the resistance, and means, dependent in operation upon the speed of rotation of the machine, for connecting either the conducting segments together or the terminal pieces together.

9. In a dynamo-electric machine, the combination with relatively rotatable primary and secondary core members, windings for the primary core member having different time constants, a winding for the secondary core member and a resistance in circuit therewith, of insulated conducting segments constituting circuit terminals for one of the primary windings, terminal pieces connected to the resistance, and means for connecting the conducting segments together at lower speeds of rotation of the machine and for connecting the terminal pieces together at the higher speeds.

10. In a dynamo-electric machine, the combination with relatively rotatable primary and secondary core members, windings for the primary core member having different time constants, a winding for the secondary core member and a resistance in circuit therewith, of insulated conducting segments constituting circuit terminals for one of the primary windings, terminal pieces connected to the resistance, and brushes that engage and electrically connect together the conducting segments at the lower speeds of rotation of the machine and that engage and electrically connect together the terminal pieces at the higher speeds of rotation of the machine.

11. In a dynamo-electric machine, the combination with relatively rotatable primary and secondary core members, windings for the primary core member having different time constants, a winding for the secondary core member and a resistance in circuit therewith, of insulated conducting segments constituting circuit terminals for one of the primary windings, terminal pieces connected to the resistance, and brushes that engage and electrically connect together either the conducting segments or the terminal pieces according to the speed of rotation of the machine.

12. In a dynamo-electric machine, the combination with relatively rotatable primary and secondary core members, starting and running windings for the primary core member, a winding for the secondary core member and a resistance in circuit therewith, of insulated conducting segments constituting circuit terminals for the starting winding, terminal pieces connected to the resistance, and means for connecting together either the primary conducting segments or the secondary terminal pieces according to the speed of rotation of the machine.

13. In a dynamo-electric machine, the combination with relatively rotatable primary and secondary core members, starting and running windings for the primary core member, a winding for the secondary core member and a resistance in circuit therewith, of insulated conducting segments constituting circuit terminals of the starting winding, terminal pieces connected to the resistance, and centrifugally operated means for electrically connecting together the conducting segments at the lower speeds of rotation of the machine and for electrically connecting together the secondary terminal pieces at the higher speeds of rotation.

14. In a dynamo-electric machine, the combination with relatively rotatable primary and secondary core members, starting and running windings for the primary core member, a winding for the secondary core member and a resistance in circuit therewith, of insulated conducting segments constituting circuit terminals of the starting winding, terminal pieces connected to the resistance, and brushes that engage and electrically connect together either the conducting segments or the secondary terminal pieces according as the speed of rotation of the machine is less or greater than a predetermined amount.

15. In a dynamo-electric machine, the combination with a primary core member, windings therefor having different time constants, a relatively rotatable secondary core member, a winding therefor having a relatively high-resistance starting circuit and a low-resistance running circuit, of an automatically operated means serving to cut one of the primary windings out of circuit and also to close the low-resistance circuit of the secondary winding.

16. In a single-phase motor, a primary and a secondary member, a starting winding, and automatic means arranged both to cut said starting winding out of circuit and to reduce the effective resistance of the secondary member when the motor is up to speed.

17. In a single-phase motor, a primary and a secondary member, a starting winding, and centrifugally actuated means arranged both to cut said starting winding out of circuit and to reduce the effective resistance of the secondary member when the motor is up to speed.

In testimony whereof, we have hereunto subscribed our names this 9th day of Sept., 1905.

BENJ. J. LAMME.
RUSSELL S. FEICHT.
GEORGE H. GARCELON.

Witnesses:
 W. A. DICK,
 FREDERIC H. RICHARDSON,
 BIRNEY HINES.